United States Patent
Quintard et al.

(10) Patent No.: US 9,221,150 B2
(45) Date of Patent: Dec. 29, 2015

(54) INSULATING PIPES OF A FACILITY FOR WORKING BY MEANS OF CRYOGENIC FLUID JETS

(75) Inventors: Jacques Quintard, Presles (FR); Frederic Richard, Parmain (FR); Charles Truchot, Poissy (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 725 days.

(21) Appl. No.: 13/393,753

(22) PCT Filed: Aug. 17, 2010

(86) PCT No.: PCT/FR2010/051722
§ 371 (c)(1),
(2), (4) Date: Mar. 1, 2012

(87) PCT Pub. No.: WO2011/027064
PCT Pub. Date: Mar. 10, 2011

(65) Prior Publication Data
US 2012/0152288 A1    Jun. 21, 2012

(30) Foreign Application Priority Data

Sep. 3, 2009    (FR) ..................................... 09 56008

(51) Int. Cl.
*B24C 3/06* (2006.01)
*F16L 59/14* (2006.01)
*B05B 13/04* (2006.01)
*B24C 1/00* (2006.01)
*B24C 3/04* (2006.01)

(52) U.S. Cl.
CPC . *B24C 1/003* (2013.01); *B24C 3/04* (2013.01); *F16L 59/141* (2013.01); *B05B 13/0421* (2013.01); *B24C 3/06* (2013.01); *Y10T 29/49826* (2015.01); *Y10T 137/6851* (2015.04)

(58) Field of Classification Search
CPC ....................... F17C 2205/0355; F16L 59/141
USPC ........................................... 62/451
See application file for complete search history.

(56) References Cited

U.S. PATENT DOCUMENTS 3,670,517 A * 6/1972 Nonnecke ...................... 62/53.2
6,070,413 A * 6/2000 Ward .............................. 62/50.7
7,310,995 B2   12/2007 Dziki
(Continued)

FOREIGN PATENT DOCUMENTS

DE          10160902       7/2003
WO          WO 9828107     7/1998

OTHER PUBLICATIONS

French Search Report, FR0956008, Apr. 28, 2010.
(Continued)

*Primary Examiner* — Michael Kornakov
*Assistant Examiner* — Natasha Campbell
(74) *Attorney, Agent, or Firm* — Elwood L. Haynes

(57) ABSTRACT

The invention relates to a facility and a method for the stripping, de-scaling, and surface treatment of coated and uncoated materials such as metals, concrete, wood, polymers, plastics or any other type of material, by means of cryogenic fluid jets at very high pressure.

14 Claims, 3 Drawing Sheets

(56) References Cited

U.S. PATENT DOCUMENTS 7,316,363 B2 1/2008 Hume et al.
2006/0049274 A1 3/2006 Hume et al.

OTHER PUBLICATIONS

PCT/FR2010/051722, International Search Report, Nov. 17, 2010.

* cited by examiner

Figure 1
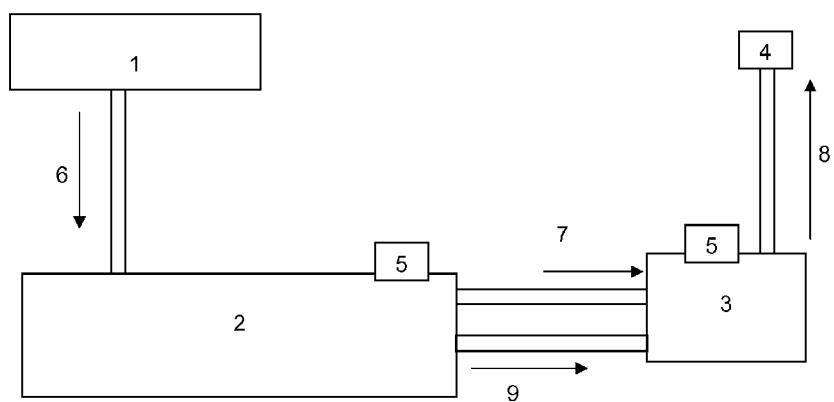
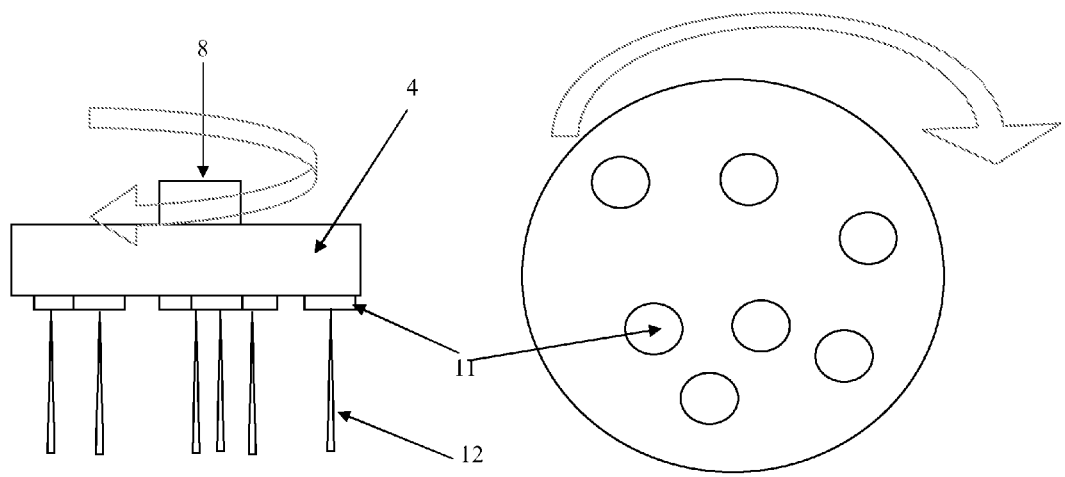
Figure 2a                    Figure 2b

INSULATING PIPES OF A FACILITY FOR WORKING BY MEANS OF CRYOGENIC FLUID JETS

CROSS-REFERENCE TO RELATED APPLICATIONS

This application is a §371 of International PCT Application PCT/FR2010/051722, filed Aug. 17, 2010, which claims priority under 35 U.S.C. §119 (a) to French Application No. 0956008, filed Sep. 3, 2009, the entire contents of which are incorporated herein by reference.

BACKGROUND

Field of the Invention

The invention relates to a facility and a method for the stripping, descaling, and surface treatment of coated and uncoated materials such as metals, concrete, wood, polymers, plastics or any other type of material, by means of cryogenic fluid jets at very high pressure.

SUMMARY OF THE INVENTION

At the present time, the surface treatment of coated or uncoated materials, in particular the striping, descaling or similar treatment of concrete, painted surfaces, or the like is essentially carried out by sandblasting, ultra high pressure (UHP) water jetting, or sanding, or by pneumatic hammer or needle gun treatment, or by chemical means.

However, in cases where it is essential to avoid the presence of water, in a nuclear environment for example, or chemical products, because of very strict environmental constraints for example, the working methods known as "dry" are the only ones that can be used.

In certain cases, however, these "dry" methods are difficult to implement, are very laborious or troublesome to use, or generate supplementary pollution, for example because of the use of shot or sand which has to be removed subsequently.

One alternative to these technologies is based on the use of cryogenic jets at very high pressure, as proposed in U.S. Pat. No. 7,310,955 and U.S. Pat. No. 7,316,363. In this case, use is made of one or more jets of liquid nitrogen at a pressure of 1000 to 4000 bars and at cryogenic temperature, between −100 and −200° C. for example, and typically between about −140° C. and −160° C., which are distributed by a nozzle holding tool to which a movement, typically a rotary or oscillating movement, is imparted.

A facility for working, for example a facility for stripping, descaling or surface treatment of coated or uncoated materials such as metals, concrete, wood, polymers, plastics or any other kind of material using cryogenic jets at very high pressure, is detailed below and is illustrated in FIG. 1.

In a facility of this kind, liquid nitrogen flows through cryogenic fluid supply pipes or conduits in which the nitrogen is at various pressures and temperatures, depending on the pipes concerned, and is notably at very low temperatures, in other words at cryogenic temperatures which may be as low as about −180° C.

Clearly, in order to keep the liquid nitrogen at cryogenic temperature, the pipes must be insulated to prevent the heating of the nitrogen during its transfer between the various elements of the facility.

This is because some of these pipes may be very long, thus creating a large surface area for heat exchange with the ambient atmosphere. For example, pipes carrying nitrogen from a reservoir to a facility rarely have a length of less than several meters, and possibly several tens of meters. Typically, the length of the pipes is in the range from about 10 to 400 m, and generally from about 50 to 250 m.

Insulation can be provided for the purpose of insulating these pipes by the following methods:

By using insulating materials placed around the pipes to form a mechanical thermal barrier. In view of the very low temperatures concerned, this solution is not very effective and its limitations soon become evident.

By creating a vacuum around some or all of the pipes. This solution is far from ideal, because it is laborious and complicated, requiring the use of vacuum devices such as vacuum pumps, which have to be integrated into the facility and which occupy a certain amount of space, require regular maintenance, and consume energy, among other considerations.

The problem which arises is therefore that of effectively insulating one, some, or all of the pipes carrying the cryogenic fluid in a facility using very high pressure cryogenic jets, without entailing substantial costs for installation or maintenance, and without unduly complicating the overall architecture of the facility.

The solution proposed by the invention is a facility for working using at least one jet of fluid at cryogenic temperature under high pressure, comprising:

at least one mobile tool having one or more nozzles for distributing cryogenic fluid, and one or more fluid pipes adapted and designed to carry fluid at cryogenic temperature to said tool in order to supply at least one fluid distribution nozzle of said mobile tool with said fluid at cryogenic temperature under high pressure, and insulating means provided on at least a part of the fluid pipe or pipes for the thermal insulation of said at least one part of the pipes, characterized in that the insulating means comprise:

at least one chamber placed around all or part of said at least one pipe or part of a pipe to be insulated, at least one source of insulating gas, and insulating gas supply means establishing fluid communication between said at least one insulating gas source and the inside of said at least one chamber, so as to supply said at least one chamber with insulating gas from said at least one insulating gas source, thereby forming an insulating gaseous atmosphere within said at least one chamber.

Depending on circumstances, the facility according to the invention can include one or more of the following features:

It also has at least one source of fluid at cryogenic temperature containing a fluid at cryogenic temperature to be carried to the tool. The fluid pipe or pipes are adapted and designed to carry fluid at cryogenic temperature from the at least one source of fluid at cryogenic temperature to the fluid distribution tool.

At least one chamber comprises a gas inlet in fluid communication with the gas supply means and a gas outlet in fluid communication with the atmosphere, thus creating a gas sweeping process in said at least one chamber.

At least one insulating gas source is a source of nitrogen.

It includes a source of fluid at cryogenic temperature and at least one heat exchanger comprising an exhaust device, particularly a vent, placed between the source of fluid at cryogenic temperature and the tool, and at least one insulating gas source comprises the exhaust device of at least one heat exchanger.

The insulating gas source comprises the exhaust device of at least one heat exchanger and the insulating gas supply means are in fluid communication with said exhaust device, in such a way that at least part of the gas escaping through said exhaust device can be recovered, conveyed and subsequently introduced into at least one chamber placed around part or all of said at least one pipe or part of a pipe to be insulated.

The insulating gas supply means comprise at least one gas feed pipe, preferably at least one gas feed pipe equipped with a device for controlling and/or adjusting the gas flow rate.

At least one chamber comprising a tubular structure forming a sleeve around part or all of said at least one pipe or part of a pipe to be insulated.

At least one chamber comprising a first and a second concentric tubular structure forming a double sleeve around part or all of said at least one pipe or part of a pipe to be insulated.

At least one layer of insulating material is arranged around at least one part of the outer periphery of the chamber, and preferably the insulating material is an insulating foam, particularly a polyurethane foam.

The movement of the tool can be rotary or oscillatory.

The invention also relates to a method for insulating part or all of at least one fluid pipe of a facility for working using at least one tool having one or more nozzles for distributing cryogenic fluid, the tool being supplied directly or indirectly with fluid at cryogenic temperature by means of the at least one fluid pipe, notably a facility for working according to the invention, characterized in that:

a) at least one chamber is placed around all or part of said at least one pipe or part of a pipe to be insulated, and b) insulating gas from at least one insulating gas source is introduced into said chamber so as to form an insulating gaseous atmosphere in said at least one chamber and around part or all of said at least one pipe or part of a pipe to be insulated.

Depending on circumstances, the method according to the invention can include one or more of the following features:

The fluid at cryogenic temperature is taken from at least one source of fluid at cryogenic temperature, such as a storage reservoir or the like.

The insulating gas is nitrogen.

The insulating gas is nitrogen taken from the exhaust device of a heat exchanger of the facility.

The cryogenic fluid distributed by the nozzle or nozzles of the tool is liquid nitrogen at a pressure of at least 100 bars, preferably at least 300 bars, or even more preferably between 1000 and 5000 bars, and at a temperature below −140° C., or preferably between about −140° C. and −180° C.

The flow of the insulating gas is in the range from 1,000 to 20,000 l/min, or preferably from 5,000 to 15,000 l/min.

At least one layer of insulating material is placed around at least a part of the outer periphery of the chamber.

At the inlet of the insulation chamber, the insulating gas has a pressure adapted to compensate for the pressure drops created by the chamber in this gas, in other words a pressure of more than 1 bar absolute, or preferably more than 2 bars.

The insulating gas flows in parallel flow or in counter-flow with the cryogenic liquid to be cooled.

The invention also relates to a method for the surface treatment, stripping or descaling of a material by means of high-pressure cryogenic fluid, wherein a facility or a method according to the invention is used.

BRIEF DESCRIPTION OF THE FIGURES

The invention will now be described more fully with reference to the appended drawings, wherein:

FIG. 1 is a schematic illustration of the operation of a working facility using cryogenic jets at very high pressure, FIGS. 2a (side view) and 2b (view from below) are schematic illustrations of the nozzle holding tool with which the facility of FIG. 1 is equipped.

DETAILED DESCRIPTION OF THE INVENTION

Figure 3:
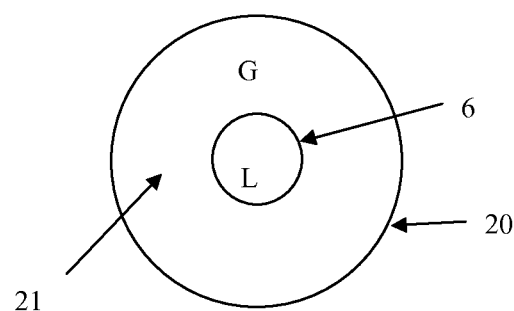
FIG. 3 is a schematic illustration of a first embodiment of an insulation chamber according to the invention.

FIG. 1 is a schematic illustration of a conventional facility for stripping, for surface treatment or similar working by means of jets of cryogenic liquid, which commonly includes a storage reservoir 1, such as a tank, of liquid nitrogen (referred to hereafter as $LN_2$), which supplies a compression device 2, with a compressor and an internal upstream heat exchanger for pressurizing the liquid nitrogen to an ultra high pressure (UHP), through a feed line 6 for liquid nitrogen at low pressure, in other words at approximately 3 to 6 bars and at a temperature of approximately −180° C. The compression device 2 can therefore compress the $LN_2$ received from the storage reservoir 1.

The $LN_2$ at the first pressure (UHP) is then carried along a conveying line (7) to an external downstream heat exchanger 3 in which the UHP $LN_2$ is cooled with liquid nitrogen at atmospheric pressure (in 9), thereby typically producing UHP liquid nitrogen.

The resulting $LN_2$ is at a pressure (UHP) which is typically greater than 300 bars, generally in the range from 2000 bars to 5000 bars, advantageously in the range from approximately 3000 to 4000 bars, and at a temperature below −140° C., typically between −140° C. and −180° C., for example approximately −150° C. to −160° C., which is sent through the supply line 8, to the stripping tool 4 or similar which delivers one or more jets of UHP liquid nitrogen, generally a plurality of jets.

The large-capacity reservoir 1, such as a tanker truck or a storage reservoir holding several thousand liters of liquid nitrogen, is generally located outside any buildings, in other words in the open. It can be stationary or mobile, and is connected to the facility in a conventional way, in other words by means of one or more insulated pipelines 6 comprising one or more control valves. The $LN_2$ is conveyed between the various elements of the system by means of insulated pipes 7, 8.

As a general rule, the compression device 2, the external exchanger 3 and especially the tool 4 are normally located in one or more buildings.

During the thermal treatment or similar procedure, there is a continual escape of gaseous nitrogen, at atmospheric pressure (approximately 1 bar) and at approximately −196° C., from the two exchangers, in other words from the upstream exchanger of the compression device 2 and from the upstream exchanger 3. This escape of gaseous nitrogen takes place through an exhaust device, such as a vent or similar, positioned on each of said heat exchangers 2, 3.

In prior art facilities, this released nitrogen is not reused, but is generally collected and discharged out of the buildings through vents 5, in order to prevent any risk of anoxia for the personnel; in other words it forms a waste gas which is discharged to the atmosphere.

As shown in FIGS. 2a (side view) and 2b (view from below), in order to increase the size of the surface which is treated, in other words which is stripped or similarly worked, use is typically made of a tool 4 with nozzles 11 of the type which is used in UHP water jet methods, but which is supplied in this case with UHP $LN_2$ (at 8), the tool being rotated or oscillated to provide rotary or oscillating jets 12 of UHP $LN_2$ which are used for stripping (or working in an equivalent way) the surface to be treated. In a known way, the nozzle holding tool 4 is usually made to rotate by a set of pinions, with or without a transmission belt, driven by an electric or pneumatic motor by means of a first rotary transmission shaft or spindle connected to the motor, a transmission box, casing or enclosure comprising a transmission mechanism with an internal set of pinions, and a second transmission shaft or spindle which is connected to the mobile tool 4 fitted with the nozzles.

As mentioned above and as can be seen in FIG. 1, the liquid nitrogen therefore flows through the installation in pipelines, conduits or similar 6, 7, 8, commonly made from stainless steel, located, notably, between the liquid nitrogen tank 1 and the compressor which is followed by the external exchanger of the compression device 2, notably along the line 6 which carries the nitrogen at low pressure (approximately 5 to 6 bars) and at −180° C., between the compression device 2 and the front exchanger 3, along the line 7 which carries nitrogen at ultra high pressure (between 3000 and 4000 bars) and at a temperature of about −40° C., and between the front exchanger 3 and the tool 4, along the supply line 8 carrying liquid nitrogen at ultra high pressure (between 3000 and 4000 bars) and at about −150° C.

It is essential for the conduits or lines 6 and 7 to be insulated, in other words protected, by an insulating material for example, in order to reduce heat losses (or in this case, losses of cold) which may occur, since these lines may be very long, with typical measurements of several meters or possibly tens of meters, for example 5 to 300 m, or typically about 10 to 250 m. It is also advisable to insulate the pipeline located between the compression device 2 and the external exchanger 3.

This is because it is preferable to prevent any parasitic heat exchanges from heating the liquid nitrogen flowing in the pipe circuit of the facility, as this would create a risk of vaporization of the liquid nitrogen and undesirable premature formation of gaseous nitrogen.

The idea which has been devised in view of the above considerations and which forms the basis of the invention is to recover the gaseous nitrogen which is usually discharged through the vents fitted on the heat exchangers 2 and 3, and to use this gas as the insulating gas to be distributed around the pipes 6, 7, 8 which are to be thermally insulated, in order to keep the liquid nitrogen flowing in these pipes 6, 7, 8 at cryogenic temperatures, in other words between −140° C. and −180° C., without the formation of undesirable gaseous nitrogen, and at lower cost. The gaseous nitrogen used as insulating gas and taken from the external exchanger 3 and/or from the internal exchanger of the compression device 2 is therefore recycled instead of being sent directly to the atmosphere through the vents 5.

However, the insulating gas, such as gaseous nitrogen, can also be taken, wholly or partially, from another gas source, in particular by using gaseous nitrogen from a gas bottle, container or reservoir, a gas supply pipe or a network of pipes, or the like. However, it is preferable to use the gaseous nitrogen which is usually discharged through the vents fitted on the heat exchangers 2 and 3, or gas from the gaseous vapor in the tank or reservoir.

The gaseous nitrogen used as the insulating gas is distributed within one or more chambers placed around the pipes 6, 7, 8 which are to be protected, in order to create a gas sweeping process which takes place inside each chamber and is therefore in contact with the line to be protected.

Since the gaseous nitrogen from the vents of the exchangers 2, 3 is cold nitrogen, in other words at a typical temperature of about −185° C. to 196° C., it can be used to limit the heating of the nitrogen flowing in said pipes 6, 7, 8 and therefore to prevent or minimize the premature vaporization of this nitrogen.

The nitrogen used for insulating the pipe 6 between the tank and the compression device 2 is discharged into the open air, in other words to the ambient atmosphere, after its extraction or release from the chamber fitted on the supply line 6. Preferably the discharge to the atmosphere takes place near the tank 1.

Where insulation is provided on the pipe or pipes 7 between the compression device 2 and the external exchanger 3, and on the line 8 connecting the external exchanger 3 to the tool 4, the nitrogen is discharged to the ambient atmosphere outside the room in which the downstream heat exchanger 3 is located, for example through the extraction system of the room or through a dedicated venting system.

As shown in FIG. 3, which illustrates a first embodiment of an insulation chamber 20 according to the invention (shown in cross section), it is possible to use a tube or sleeve, having a larger diameter than that of the conduit 6 which is to be insulated, and in which the liquid nitrogen (L) flows, as the insulation chamber 20 into which gaseous nitrogen (G) at low pressure (approximately 5 to 6 bars) is introduced. In this case, the two tubes 20 and 6 are theoretically concentric or practically concentric. This insulation chamber 20 can also be fitted on a line 7, 8 carrying gaseous nitrogen (L) at high pressure (approximately 3000 to 4000 bars).

Figure 4:
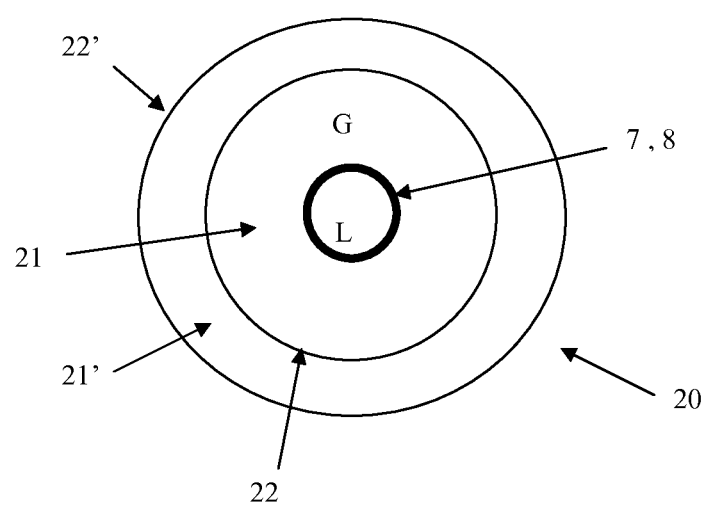
FIG. 4 is a schematic illustration of a second embodiment of an insulation chamber according to the invention.

FIG. 4 shows a second embodiment of an insulation chamber 20 according to the invention (seen in cross section), which in this case is formed by two tubes or sleeves 22, 22' whose diameter is greater than that of the conduit 6 to be insulated, in which the liquid nitrogen flows (L). In this case, the three tubes 22, 22' and 6 are theoretically concentric or practically concentric.

These two tubes or sleeves 22, 22' form a two-way insulating gas system, making it possible, notably, to prevent or minimize discharges of gaseous nitrogen into the buildings which would create risks of anoxia in the personnel. In this case, the gaseous nitrogen is introduced, for example, into the first insulating tube 22, flows through the inside 21 of this tube, thus sweeping the outer surface of the central conduit 7 containing the high-pressure liquid nitrogen, then passes into the inside 21' of the second insulating tube 22', flows through the inside 21' of this tube, thus sweeping the outer surface of the insulating tube 22 in the opposite direction, and is then discharged to the atmosphere as explained above.

These two tubes 22, 22' containing low-temperature gaseous nitrogen (G) taken from the vents 5 of the heat exchangers 2, 3 therefore act as a thermal barrier limiting the heat exchange between the ambient atmosphere and the central conduit 7, 8, in other words the loss of cold and the heating of the liquid nitrogen carried by the central conduit 7, 8.

It should be noted that it is also preferable to provide several centimeters, for example 1 to 6 cm, of an insulating material, such as rubber or ethylene propylene diene monomer (EPDM), around the outer surfaces of the pipes to be insulated, for thermal reasons and also in order to protect the operator from possible cryogenic burns.

It is also possible to use polyisocyanurate, polyurethane, glass wool, rock wool or any other type of conventional insulation as a supplementary insulating material.

Figure 5:
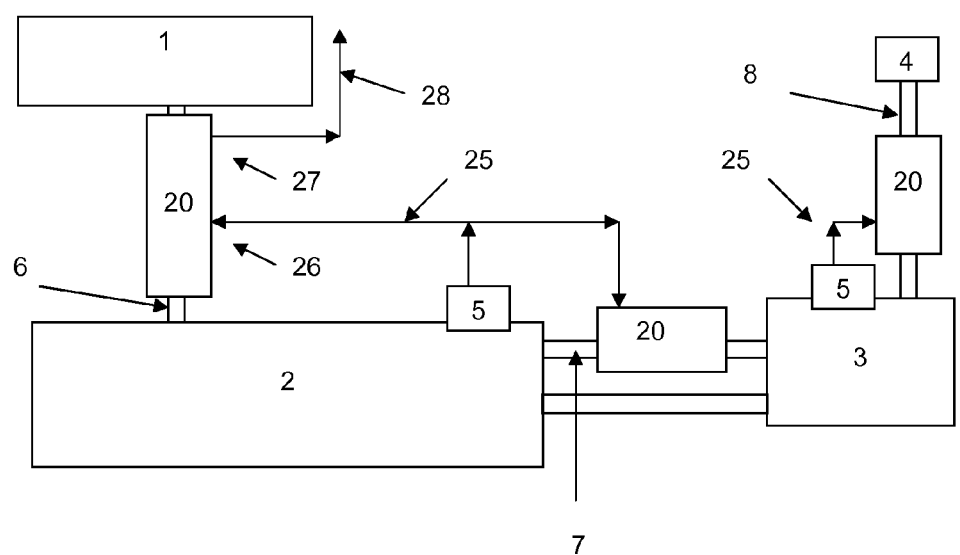
FIG. 5 is a schematic illustration of a facility for working according to the invention.

FIG. 5 is a schematic illustration of a facility for descaling, surface treatment or similar working using jets of cryogenic liquid according to the present invention. As can be seen, this is similar to the facility shown in FIG. 1, except for the fact that each of the nitrogen feed lines 6, 7, 8 has been fitted with an insulation chamber 20 according to the invention, for example concentric tubes 20, 22, 22' according to the principle of FIG. 3 or 4, which are supplied with nitrogen from the vents 5 of the heat exchangers 2, 3 of the facility. The insulating nitrogen is recovered at the outlets of the vents 5 and is then conveyed along the gaseous nitrogen feed lines 25 to the chamber 20.

In the present case, the vent 5 of the upstream exchanger of the compression device 2 supplies the insulation chambers 20 fitted on the lines 6 and 7, while the chamber 20 of line 8 is supplied with nitrogen taken from the vent 5 of the downstream exchanger 3. However, this embodiment is not exclusive or limiting; that is to say, any vent 5 can supply any chamber 20 of any of the lines 6, 7, 8.

As detailed for the chamber 20 fitted on the line 6, the gaseous nitrogen conveyed by the pipe circuit 25 is introduced through an inlet 26 into the chamber 20 so as to create a gas sweeping process therein, as explained above, and is then extracted from the chamber 20, through an outlet 27, before being conveyed and discharged to the atmosphere 28. The various chambers 20 can operate on the same principle.

It should be noted that, instead of discharging the nitrogen leaving an outlet 27 of a first chamber, it would be possible to recover it and send it towards the inlet 26 of a second chamber 20, and so on, thereby creating a kind of sweep gas circuit. It is also possible to provide a plurality of inlets 26 and/or a plurality of outlets in a single chamber 20.

The gaseous nitrogen can sweep the surfaces of the lines 6, 7, 8 inside the chambers 20 in parallel flow or in counter-flow.

EXAMPLE

Effectiveness of Insulation Using Gaseous Nitrogen at a Temperature of −196° C.

In order to provide effective thermal insulation according to the invention for a UHP pipeline made of stainless steel (304 or 316), with a length of 150 m, which carries UHP nitrogen (at between 3000 and 4000 bars) at a temperature of about −150° C. to −160° C. between the downstream exchanger 3 and the nozzle holding tool 4 of FIG. 5, using a single sleeve chamber 20 as shown in FIG. 3, in which the gaseous nitrogen travels in one direction only before being discharged to the atmosphere, the following parameters can be used:

Tubes: outside diameter 14.8 mm, tube length 150 m;
Liquid nitrogen ($LN_2$): Temperature of liquid nitrogen at the inlet of the tube: −155° C.,
and liquid nitrogen flow rate: 5 l/min.
Gaseous nitrogen:
  Temperature of gaseous nitrogen at the inlet of the tube: −196° C.
  Flow rate of gaseous nitrogen escaping from the exchangers: 10 m³/min
  Flow rate of gaseous nitrogen in one of the four tubes to be insulated: 2.5 m³/min
  Thickness of the nitrogen gas insulation: 10 mm
Insulation/protection: Mean thermal conductivity of EPDM (ethylene propylene diene monomer) foam around the two concentric tubes: 0.025 W/(m·K); mean conductivity of polyurethane foam around the two concentric tubes at cryogenic temperatures: 0.019 W/(m·K)
Other parameters: continuous operation; constant thermophysical properties of the fluids in the temperature range; temperatures varying in the direction of the outflow only; negligible pressure drop.

The results are given in the table below.

TABLE

| | Insulation: $N_2$* (parallel flow) + EPDM foam | Insulation: $N_2$* (counter-flow) + EPDM foam | Insulation: EPDM foam only | Insulation: polyurethane foam only |
|---|---|---|---|---|
| Temperature of liquid nitrogen at inlet | −155° C. | −155° C. | −155° C. | −155° C. |
| Temperature of liquid nitrogen at outlet | −154° C. | −179° C. | −145° C. | −145° C. |
| Insulation thickness | 30 mm including 10 mm of $N_2$ | 30 mm including 10 mm of $N_2$ | 125 mm | 60 mm |

*To compensate for the pressure drop in the nitrogen gas due to the pipework, the nitrogen gas must be pressurized to 5 bars in the following example.

Clearly, the provision of cold nitrogen gas insulation (which is swept around the pipe carrying the liquid nitrogen) makes it possible not only to use a smaller insulation thickness than in the absence of nitrogen insulation, but also to achieve a lower liquid nitrogen outlet temperature than that which would be obtained with insulation only, resulting in a greater length of jet coherence and consequently greater efficiency. Preferably, double insulation is provided, by using nitrogen with solid insulation in the form of an insulating foam, preferably polyurethane.

For a further understanding of the nature and objects for the present invention, reference should be made to the detailed description, taken in conjunction with the accompanying drawing, in which like elements are given the same or analogous reference numbers and wherein:

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A facility for working, using at least one jet of fluid at cryogenic temperature under high pressure, comprising:
  a) at least one mobile tool having one or more nozzles for distributing cryogenic fluid, and
  b) one or more fluid pipes adapted and designed to carry fluid at cryogenic temperature to said mobile tool in order to supply at least one fluid distribution nozzle of said mobile tool with fluid at cryogenic temperature under high pressure, at least one part of the fluid pipe or pipes comprising insulating means for the thermal insulation of said at least one part of the pipes, wherein the insulating means comprise:
c) at least one chamber placed around all or part of said at least one pipe or part of a pipe to be insulated,
d) at least one source of insulating gas, and
e) insulating gas supply means establishing fluid communication between said at least one insulating gas source and the inside of said at least one chamber, so as to supply said at least one chamber with insulating gas from said at least one insulating gas source, thereby forming an insulating gaseous atmosphere within said at least one chamber, wherein the insulating gas source comprises the exhaust device of at least one heat exchanger, the insulating gas supply means being in fluid communication with said exhaust device in such a way that at least part of the gas escaping through said exhaust device can be recovered, conveyed and subsequently introduced into at least one chamber placed around part or all of said at least one pipe or part of a pipe to be insulated.

2. The facility of claim 1, wherein at least one chamber comprises a gas inlet in fluid communication with the gas supply means and a gas outlet in fluid communication with the atmosphere, thus creating an insulating gas sweeping process inside said at least one chamber.

3. The facility of claim 1, wherein at least one insulating gas source is a nitrogen source.

4. The facility of claim 1, further comprising a source of fluid at cryogenic temperature and at least one heat exchanger comprising an exhaust device, placed between the source of fluid at cryogenic temperature and the tool, and in that at least one insulating gas source comprises the exhaust device of at least one heat exchanger.

5. The facility of claim 1, wherein the insulating gas supply means comprise at least one gas feed pipe equipped with a device for controlling and/or adjusting the gas flow rate.

6. The facility of claim 1, wherein at least one chamber comprising a tubular structure forming a sleeve around part or all of said at least one pipe or part of a pipe to be insulated.

7. The facility of claim 1, wherein at least one chamber comprising a first and a second concentric tubular structure forming a double sleeve around part or all of said at least one pipe or part of a pipe to be insulated.

8. The facility of claim 1, wherein at least one layer of insulating material is placed around at least one part of the outer periphery of the chamber.

9. A method for insulating part or all of at least one fluid pipe of a facility according to claim 1, wherein:
a) at least one chamber is placed around all or part of said at least one pipe or part of a pipe to be insulated, and
b) insulating gas from at least one insulating gas source is introduced into said chamber so as to form an insulating gaseous atmosphere within said at least one chamber and around part or all of said at least one pipe or part of a pipe to be insulated.

10. The method of claim 9, wherein the insulating gas is nitrogen which has a pressure of more than 1 bar, at the inlet of the insulation chamber.

11. The method of claim 10, wherein the insulating gas has a pressure of 2 bars, at the inlet of the insulation chamber.

12. The method of claim 9, wherein the insulating gas is nitrogen taken from the exhaust device of a heat exchanger of the facility.

13. The method of claim 9, wherein the cryogenic fluid distributed by the nozzle or nozzles of the tool is liquid nitrogen at a pressure of at least 100 bars, and at a temperature below −140° C.

14. The method of claim 13, wherein the cryogenic fluid distributed by the nozzle or nozzles of the tool is liquid nitrogen at a pressure of between 1000 and 5000 bars, and at a temperature between about −140° C. and −180° C.

* * * * *